(12) United States Patent
Yamaai

(10) Patent No.: US 7,151,859 B2
(45) Date of Patent: Dec. 19, 2006

(54) METHOD AND SYSTEM FOR CORRECTING DIRECTION OR ORIENTATION OF DOCUMENT IMAGE

(75) Inventor: Toshifumi Yamaai, Yokohama (JP)

(73) Assignee: Ricoh Company, Ltd, Tokyo (JP)

( * ) Notice: Subject to any disclaimer, the term of this patent is extended or adjusted under 35 U.S.C. 154(b) by 807 days.

(21) Appl. No.: 10/342,678

(22) Filed: Jan. 15, 2003

(65) Prior Publication Data

US 2003/0174904 A1  Sep. 18, 2003

(30) Foreign Application Priority Data

Jan. 16, 2002 (JP) ............................ 2002-007933

(51) Int. Cl.
*G06K 9/36* (2006.01)
*G06K 9/40* (2006.01)
*H04N 1/04* (2006.01)

(52) U.S. Cl. ....................... 382/292; 382/274; 382/291

(58) Field of Classification Search ................ 382/289, 382/290, 292, 294, 295, 296, 274, 254; 358/1.18, 358/1.5, 1.9, 462, 474, 488, 3.01
See application file for complete search history.

(56) References Cited

U.S. PATENT DOCUMENTS

| | | | | |
|---|---|---|---|---|
| 5,594,814 A | * | 1/1997 | Fast et al. | 382/254 |
| 6,282,326 B1 | * | 8/2001 | Lee et al. | 382/289 |
| 6,345,763 B1 | * | 2/2002 | Matsuda et al. | 235/459 |
| 6,567,060 B1 | * | 5/2003 | Sekiguchi | 345/87 |
| 6,633,406 B1 | * | 10/2003 | Imaizumi et al. | 358/1.18 |

* cited by examiner

*Primary Examiner*—Yon J. Couso
(74) *Attorney, Agent, or Firm*—Knoble Yoshida & Dunleavy, LLC

(57) ABSTRACT

A document image is often accidentally placed at an undesirable angle during image scanning. In order to correct the orientation of the image document, an angle must be determined based upon the document image. In determining the angle, the document image is processed to reverse the brightness as necessary.

14 Claims, 13 Drawing Sheets

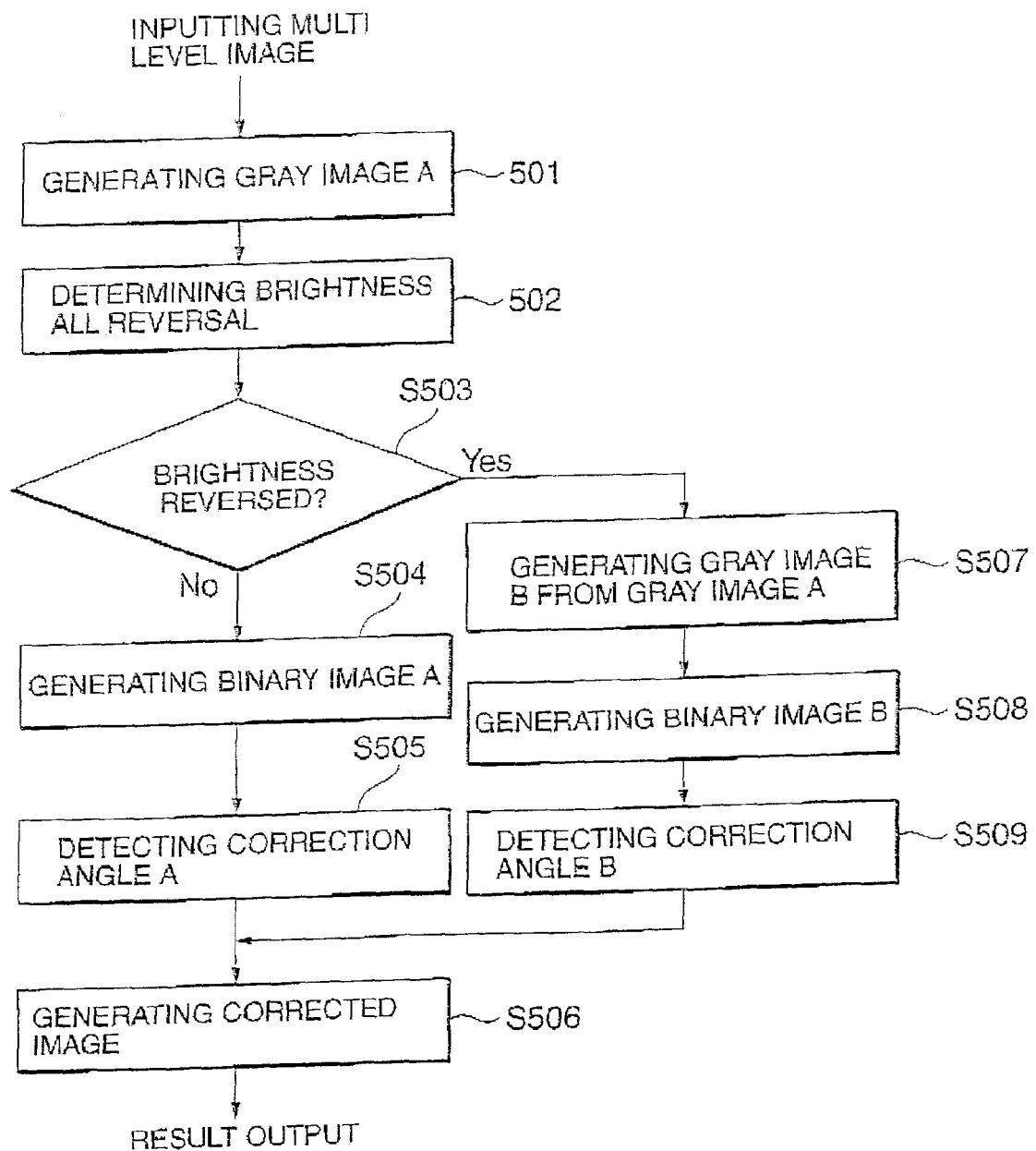

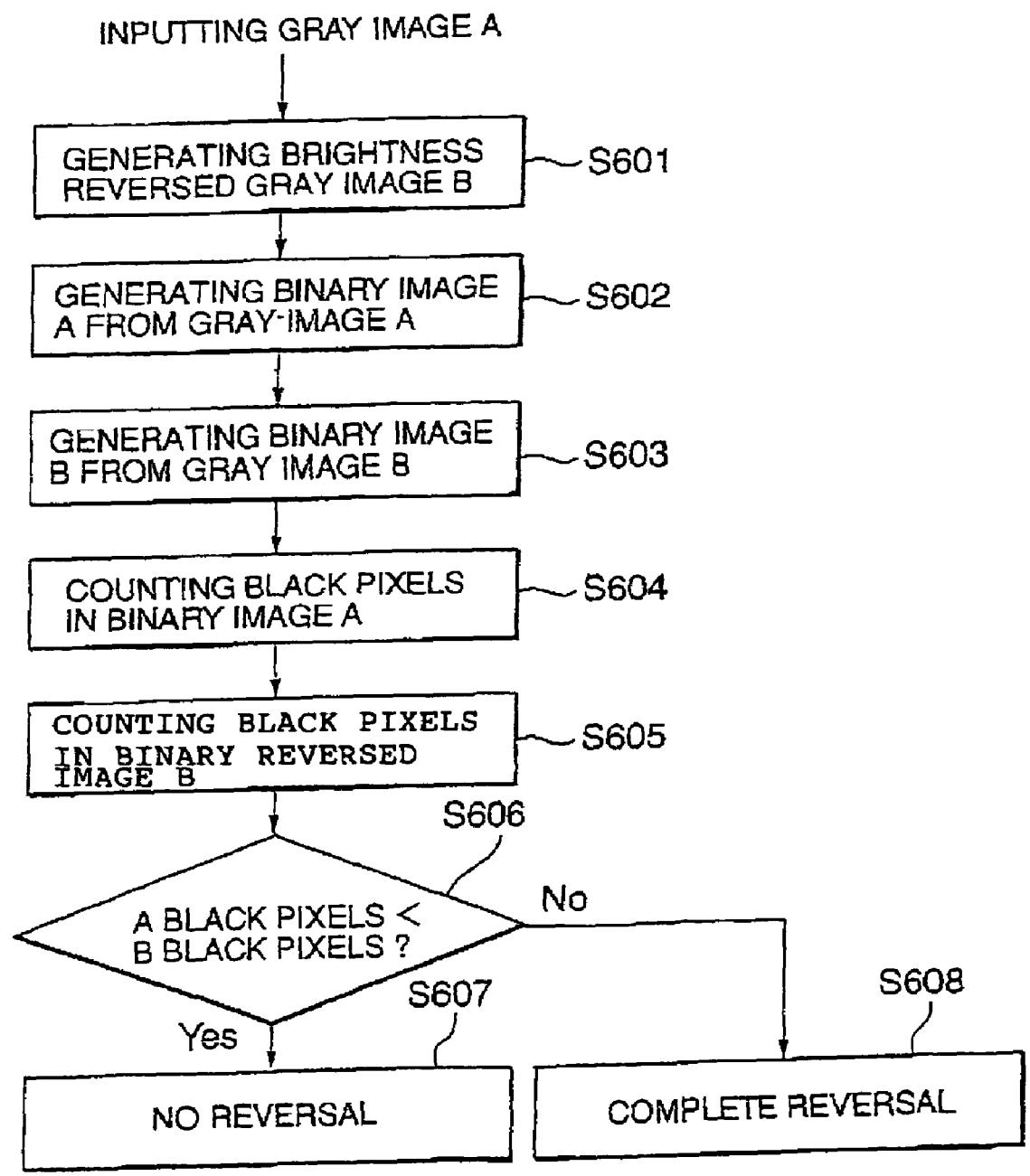

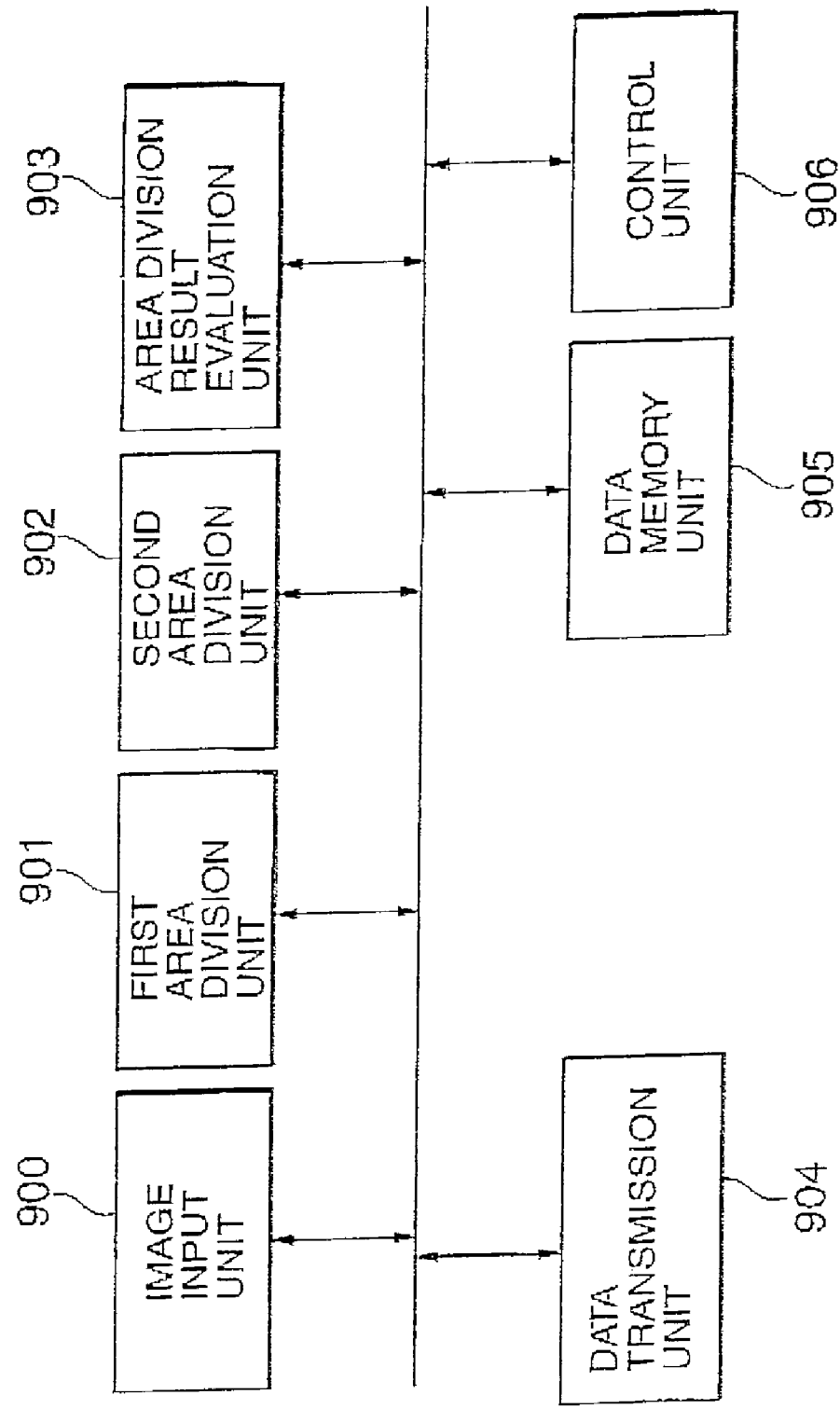

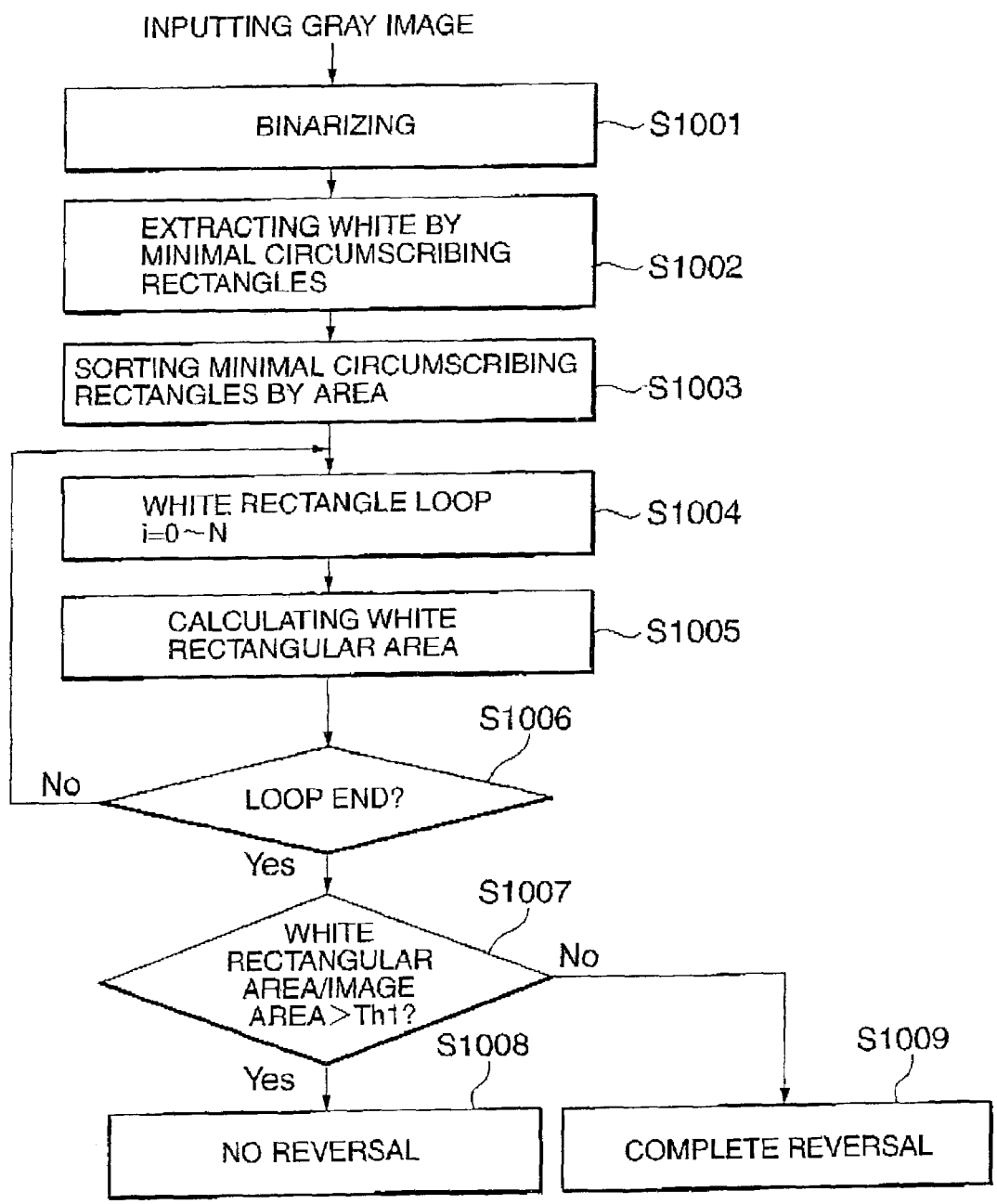

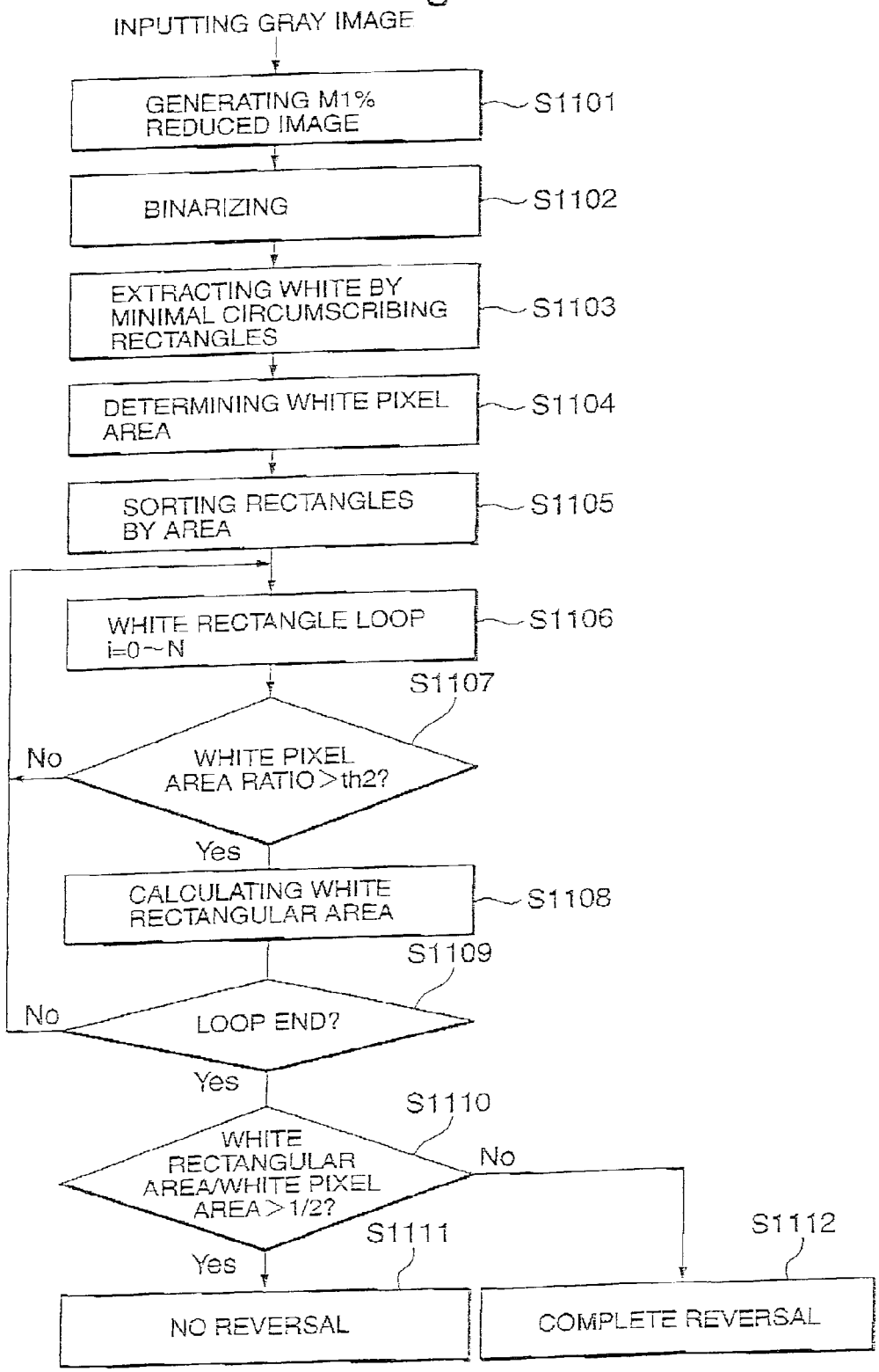

METHOD AND SYSTEM FOR CORRECTING DIRECTION OR ORIENTATION OF DOCUMENT IMAGE

FIELD OF THE INVENTION

The current invention is generally related to image processing of document image prior to a character recognition process and more particularly related to detecting the direction and the angle of the multi-value document image as well as extracting the reversed characters prior to the character recognition process.

BACKGROUND OF THE INVENTION

In the prior art, it has been known to temporarily generate binary data from color or monochromatic gray scale image data for detecting the direction and the angle of the document image as well as for performing character recognition. For example, Japanese Patent Publication Hei 6-068245 discloses a method for detecting the angle of the image after the original image data is converted into binary data. Furthermore, Japanese Patent Publication Hei 10-143608 proposes a binary data generation technique in which original data is digitized or digitized based upon an appropriate threshold value and an average line width is determined. By comparing the average line width to a predetermined range of values, it is determined whether or not the binary data is appropriate for the character recognition process. If it is determined that the binary data is not appropriate, the binarization process takes place again.

The current inventor has proposed the angle detection technique in Japanese Patent Publication Hei 7-105310 and the direction detection technique in Japanese Patent Publication 2000-113103. Furthermore, Japanese Patent 2743378 discloses a technique to determine the background and the characters in the binary data and to convert the characters in black. Japanese Patent Publication Hei 8-249421 discloses a technique for determining a black-white reversal by comparing a black-pixel density characteristic value to a predetermined reversal standard value. The black-pixel density characteristic value is determined by counting the black and white pixels. When the above described techniques are combined, it is possible to detect the skew angle and the direction of the document even though an image with a large number of reversed portions is inputted.

The techniques as disclosed in Japanese Patent Publication Hei 6-068245 and Japanese Patent Publication Hei 10-143608 cannot detect the skew angle or the direction of the document in certain situations where the input data has many black-and-white reversed portions in monochrome data or brightness reversed portions in color data. In color data, the brightness of the background and the characters are reversed as if the black and white portions are reversed in the monochrome data. There are a number of reasons for failing to detect the skew angle and the document direction. For example, to determine the skew angle, no straight line exists in the image data or no character exists in a stable manner. Another example is that a plurality of possible directions exists in the same image such as a character "H" or a number "8." Similar situations exist with certain Japanese characters such as "工, 工, 田." Another reason for failure is that the white characters are on the black background rather than the other way around.

The techniques of Publication Hei 7-105310 and Japanese Patent Publication 2000-113103 presuppose that characters are written in black on white background. Since characters are extracted by determining minimal circumscribing rectangles for black lines, the above techniques almost certainly fail to obtain the desirable character rectangles for the white characters on the black background. On the other hand, the techniques as disclosed in Japanese Patent 2743378 and Japanese Patent Publication Hei 8-249421 mistakenly recognize the reversal in certain image data despite the white characters on the black background. The erroneous recognition is caused since the black pixels exceed the white pixels in number in certain image data that is obtained by scanning a cutout newspaper article without closing the scanner cover or by taking a digital photo of white characters on the black paper against dark background.

To solve the above described problems, the current invention provides an image processing technique for outputting useful information for character recognition as well as for detecting the tilt angle and the direction of the image document even though the multi-value image is reversed such that the light characters are over the dark background.

SUMMARY OF THE INVENTION

In order to solve the above and other problems, according to a first aspect of the current invention, a method of detecting the direction of a document image, including the steps of: inputting the document image in original multi-value data; digitizing the multi-value data into digitized image data; detecting the direction of the document image based upon the digitized image data; in case the direction detection failed, reversing brightness of the original multi-value data into brightness reversed image data; digitizing the brightness reversed image data into digitized brightness reversed image data; and detecting the direction of the document image based upon the digitized brightness reversed image data.

According to a second aspect of the current invention, a method of detecting the direction of a document image, including the steps of: inputting the document image in original multi-value data; determining whether the document image has been reversed in brightness; and in case that the document image has not been reversed in brightness, digitizing the multi-value data into digitized image data; and detecting the direction of the document image based upon the digitized image data; or in case that the document image has been reversed in brightness, reversing brightness of the original multi-value data into brightness reversed image data; digitizing the brightness reversed image data into digitized brightness reversed image data; and detecting the direction of the document image based upon the digitized brightness reversed image data.

According to a third aspect of the current invention, a system for detecting the direction of a document image, including: a document input unit for generating the document image in original multi-value data; a brightness reversing unit for reversing brightness of the document image; a digitizing unit connected to the document input unit for digitizing the multi-value data into digitized image data; a direction detection unit connected to the brightness reversing unit and the digitizing unit for detecting the direction of the document image based upon the digitized image data, in case the direction detection unit failing to detect the direction, the brightness reversing unit reversing brightness of the original multi-value data into brightness reversed image data, the digitizing unit digitizing the brightness reversed image data into digitized brightness reversed image data so that the direction detection unit detecting the direction of the document image based upon the digitized brightness reversed image data.

According to a fourth aspect of the current invention, a system for detecting the direction of a document image, including: a document input unit for generating the document image in original multi-value data; a digitizing unit connected to the document input unit for digitizing the document image; a brightness reversing unit connected to the document input unit for reversing brightness of the document image; a direction detection unit connected to the document input unit for detecting direction of the document image; and a brightness reversal determination unit connected to the document input unit for determining whether the document image has been reversed in brightness, in case that the document image has not been reversed in brightness, the digitizing unit digitizing the multi-value data into digitized image data, the direction detection unit detecting the direction of the document image based upon the digitized image data, or in case that the document image has been reversed in brightness, the brightness reversing unit reversing brightness of the original multi-value data into brightness reversed image data, the digitizing unit digitizing the brightness reversed image data into digitized brightness reversed image data, and the direction detection unit detecting the direction of the document image based upon the digitized brightness reversed image data.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 5 is a flow chart illustrating steps involved in a fourth preferred process of the document processing prior to the character recognition process according to the current invention.

FIG. 6 is a flow chart illustrating steps involved in a tenth preferred process of the document processing prior to the character recognition process according to the current invention.

FIG. 9 is a block diagram illustrating components for implementing the above area division technique.

FIG. 10 is a flow chart illustrating steps involved in the above described process of determining the brightness reversal based upon the areas in the fourteenth preferred process according to the current invention.

FIG. 11 is a flow chart illustrating steps involved in a seventeenth preferred process of determining the brightness reversal according to the current invention.

DETAILED DESCRIPTION OF THE PREFERRED EMBODIMENT(S)

Figure 1:
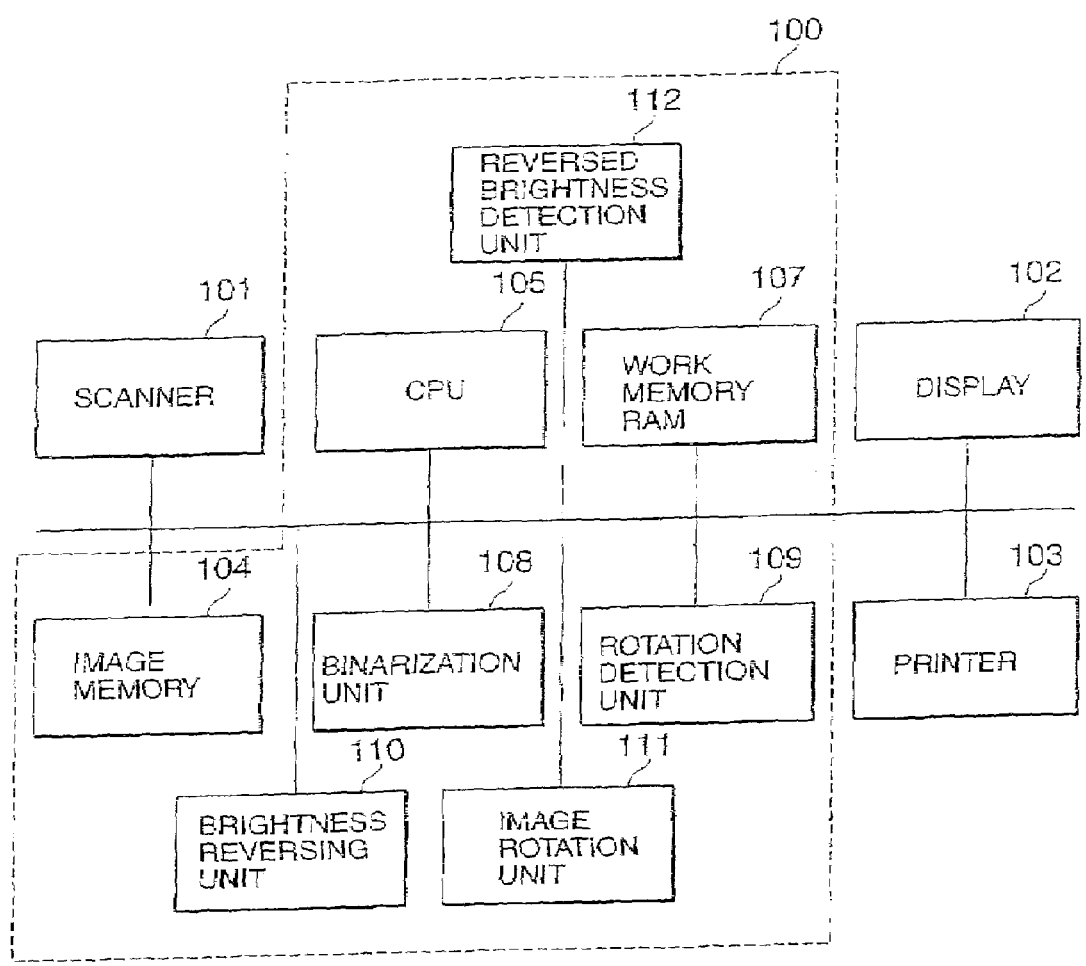
FIG. 1 is a block diagram illustrating one preferred embodiment of the character recognition device according to the current invention.

Now referring to FIG. 1, a block diagram illustrates one preferred embodiment of the character recognition device according to the current invention. In the preferred embodiment, a preferred method of image processing is performed according to the current invention. The character recognition device 100 performs character recognition on the image data that is scanned from a scanner 101 and outputs the character data such as text to a display unit 102 and a print device 103 such as a printer. The character recognition device 100 further includes an image memory unit 104 for storing the image data from the scanner 101, a central processing unit (CPU) 105 for performing a character recognition process on the image data in the image memory unit 104, a random access memory (RAM) 107 to be used as a data work area for the CPU 105 during the character recognition process, and other functional units 108 through 112 for performing pre-character recognition processes. In one implementation, these functional units 108 through 112 are implemented as modules or a part of a character recognition process program. The functional units include a binarization unit 108 for binarizing the input data having multi-gradation levels, a rotation detection unit 109 for detecting an angle or the direction of the binary image data, a brightness reversing unit 110 for reversing the brightness of an image, an image rotation unit 111 for rotating the image, and a reversed brightness detection unit 112 for detecting a brightness reversal in the image data. The above functional units 108 through 112 are implemented in the means or the software modules. The data and the information from the above functional units 108 through 112 are supplied to an optical character recognition unit (OCR) and are used during the character recognition process.

Figure 2:
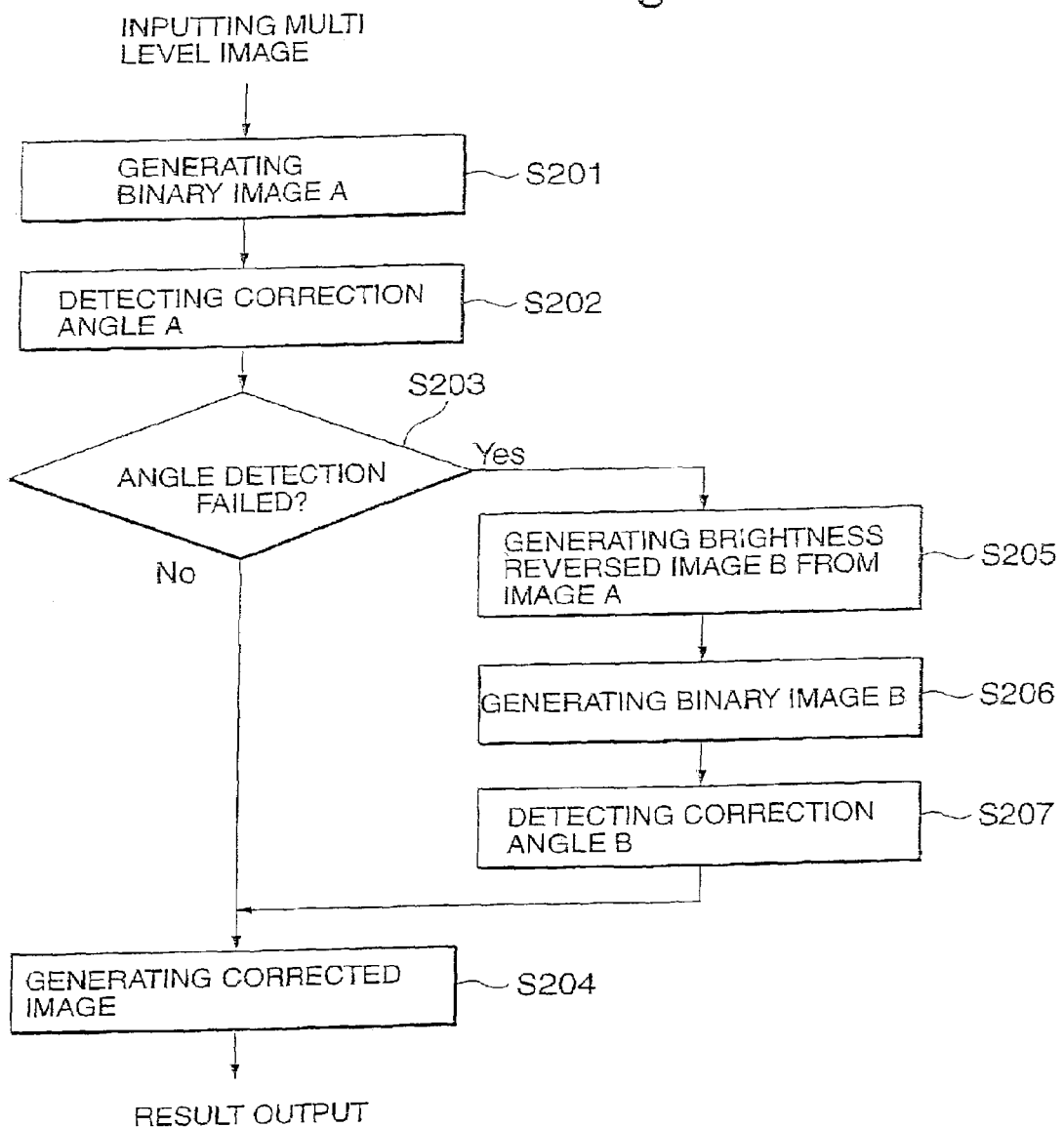
FIG. 2 is a flow chart illustrating steps involved in a preferred process of the document processing prior to the character recognition process according to the current invention.

Now referring to FIG. 2, a flow chart illustrates steps involved in a preferred process of the document processing prior to the character recognition process according to the current invention. The steps will be also described with respect to the units of FIG. 1. The above pre-character recognition process determines the angle and the direction of the document image in order to correct these characteristics. If necessary, the image is reversed, and the reversed image is used to detect and correct the angle and the direction before the image data is outputted to the character recognition unit. For this preferred embodiment and other preferred embodiments, when multi-color level image data is inputted, the image data is color gray converted. Furthermore, the gray image data is digitized based upon a predetermined threshold value. To gain a relatively dark image, the parameter uses a value of 100 to digitize or digitize the image data. The reason will be described later for not utilizing the adjustable binarization. The binarization unit 108 initially digitizes the input color multi-value image to generate binary image data A in a step S201. The binarization includes any method including discrimination analysis. Subsequently, in a step S202, a tilted angle or a skew angle as well as the direction of the binary image data A are detected in order to determine a correction angle A. As described above, in stead of using the multi-value image data, the image data is digitized, and the angle and the direction are determined based upon the binary image data. A plurality of similar detection techniques has existed as disclosed in Japanese Patent Publication Hei 6-068245. The preferred method does not limit to any particular technique to determine the correction angle of the image data according to the current invention.

Still referring to FIG. 2, after the detection, it is determined whether or not the detection of the angle or the direction has failed in a step S203. When it is not failed or succeeded, the preferred process proceeds to a step S204, where the corrected image data is generated based upon the detected angle and direction. On the other hand, when it is determined that the detection has indeed failed in the step S203, the preferred process subsequently performs a process to determine whether or not a black and white reversal caused the failure. In other words, black and white reversed image data or brightness reversed image data is generated in a step S205. The angle detection is attempted for the second time using the above generated image data. It has been known that a stable character image is not obtained simply by reversing the binary image. Since it is likely that a general document image uses a dark color for characters, thin dark characters are predetermined so that they do not fade. Even if an adjustable binarization method is used, it is likely that the parameters are used to leave the dark or black portions. For this reason, the binary image having light thin characters over a dark background tends to have fading of these characters.

The adjustable binarization of the current applicant as disclosed in Japanese Publication 2001-008032 divides the image into blocks and digitizes each block based upon a predetermined threshold value for the block. The threshold value is corrected so that the threshold value does not greatly differ from the one for an adjacent block. As a result of the corrected threshold value, the binarization does not cause to have a line on a boundary between the blocks. As described above, the threshold value is changed for a portion of the image as the entire image is digitized, and this method is called an adjustable binarization. A particular adjustable binarization method is characterized by utilizing a block as a unit for adjusting the threshold value. Generally, each block is supposed to contain both white and black pixels. Using that a valley in the darkness distribution is a threshold value, an idea assumes that black and white pixels are clearly separated. On the other hand, if only black pixels exist in a particular block, despite the black only background, the calculation to separate the white pixels from the black pixels may digitize a certain slightly less dark area of the block as white pixels. For this reason, if light and fine characters exist in the dark background as described above, the binary image tends to fade.

Still referring to FIG. 2, for the above described reasons, the step 205 generates image data having brightness reversal from an original input image having multicolor values. In a step S206, binary image data B is again generated from the brightness reversed data. Subsequently, the skew angle or the angle as well as the direction of the document image are determined again based upon the binary image data B in a step S207. After the above information is obtained, the preferred process proceeds to the step 204, where the corrected image data is generated based upon the detected angle and direction. According to the above described process, among the previously failed images, when the entirely reversed image is inputted in multi-colors, the detection of the angle and the direction of the image document are now successfully processed. Furthermore, if either the document angle or direction is unsuccessfully detected in the step S203, it is determined that the detection is failed. However, another preferred process differentiates the above angle and direction detection step to output that either of the detections is failed or that both of the detections are failed. For example, if the angle detection fails, the direction detection is resumed. If only the angle detection fails, the angle failed detection is reported. In this case, when either the angle or direction is failed, the step S203 determines that the detection is failed.

Figure 3:
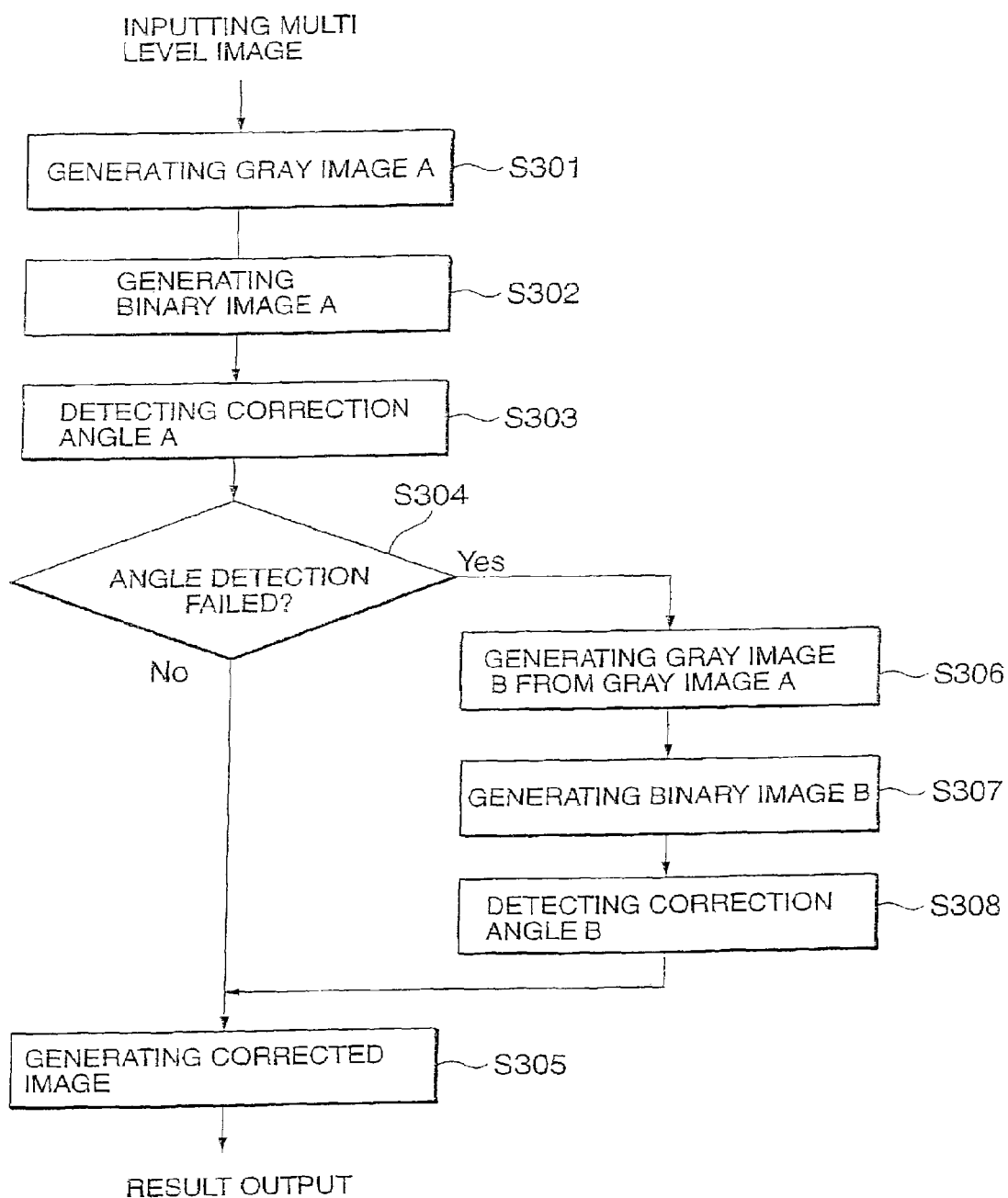
FIG. 3 is a flow chart illustrating steps involved in a second preferred process of the document processing prior to the character recognition process according to the current invention.

Now referring to FIG. 3, a flow chart illustrates steps involved in a second preferred process of the document processing prior to the character recognition process according to the current invention. The difference between the first preferred embodiment and the second preferred embodiment is that the gray scale image data A is generated from the input color image data in the second preferred embodiment in a step S301. The gray image generation methods from the gray image data include a conversion equation from RGB as well as the simplest method using only the G values. The gray scale image data A is kept, and binary image data A is generated from the gray scale image data in a step S302. Subsequently, in a step S303, a tilted angle or a skew angle as well as the direction of the binary image data A are detected in order to determine a correction angle A. After the detection, it is determined whether or not the detection of the angle or the direction has failed in a step S304. When it is not failed or succeeded, the preferred process proceeds to a step S2305, where the corrected image data is generated based upon the detected angle and direction. On the other hand, when it is determined that the detection has indeed failed in the step S304, the preferred process subsequently performs a process to determine whether or not a black and white reversal caused the failure. In other words, black and white reversed image data or brightness reversed gray image data B is generated in a step S306. The reversed gray image data B is again digitized to generate the digitized image data B in a step S307. The angle detection is attempted in a step S308 for the second time using the above generated binary image data B. Lastly, the angle and/or direction corrected image document is generated in a step S308. In the above described process, based upon the input color image, the gray scale image data is initially generated, and the brightness reversed gray image data is subsequently generated. Furthermore, the above generated data, the digitized data and the storage of the reversed image make the processing time and the memory storage capacity more cost effective than the direct processing of the multi-value image.

Figure 4:
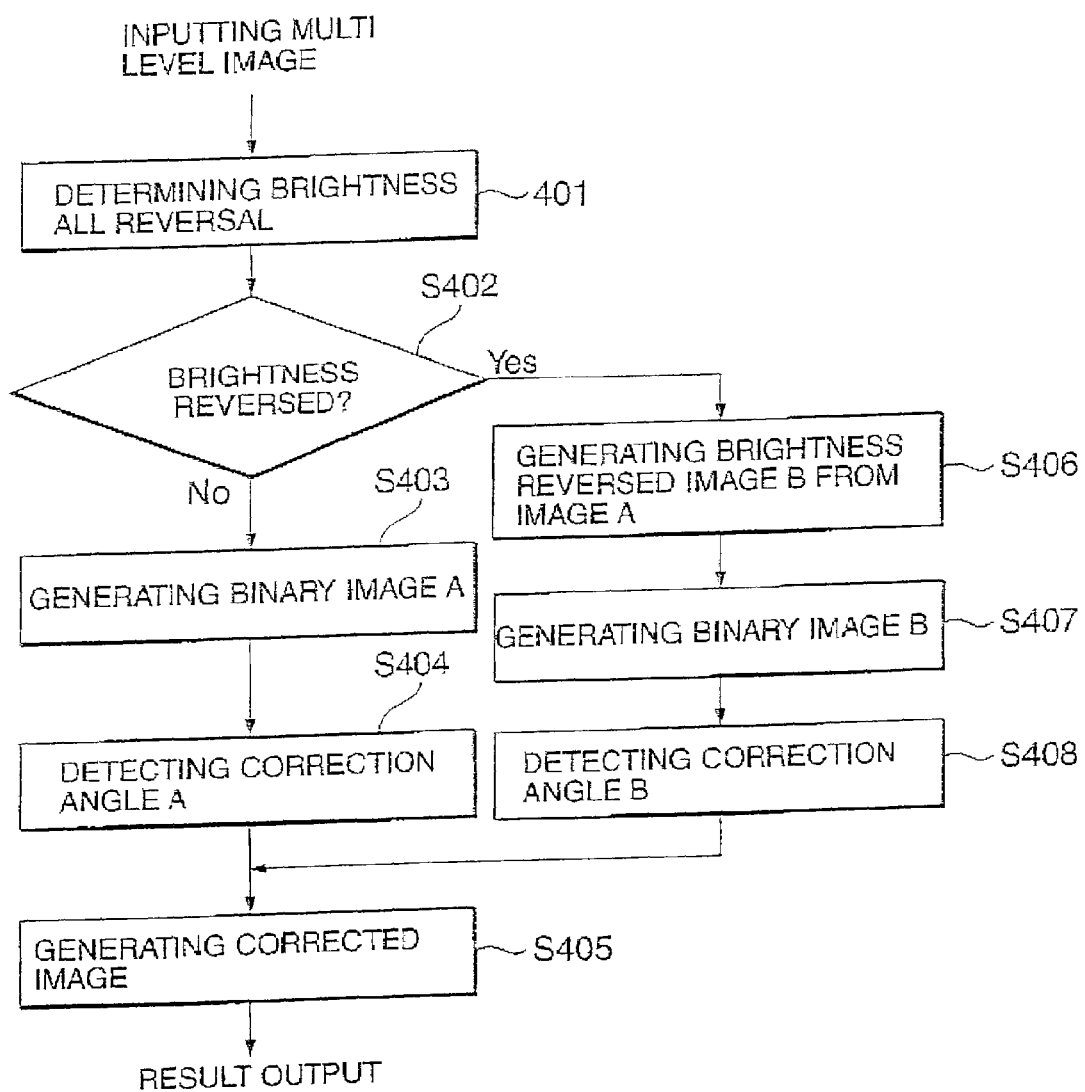
FIG. 4 is a flow chart illustrating steps involved in a third preferred process of the document processing prior to the character recognition process according to the current invention.

Now referring to FIG. 4, a flow chart illustrates steps involved in a third preferred process of the document processing prior to the character recognition process according to the current invention. Initially, it is determined whether or not the input multi-value color image has been entirely reversed in brightness in a step S401. The brightness reversal determination process will be later described in detail. It is determined whether or not brightness has been entirely reversed in a step S402. If it is determined in the step S402 that the brightness has not been reversed, binary image data A is generated from the input multi-value color image in a step S403. The angle/direction detection is attempted in a step S404 using the above generated binary image data A. Subsequently, the angle and/or direction corrected image document is generated based upon the detected angle and direction in a step S405. On the other hand, when it is determined that the brightness has been indeed reversed in the step S402, black and white reversed image data or brightness reversed image data B is generated in a step S406. The reversed image data B is again digitized to generate the digitized image data B in a step S407. The angle detection is attempted in a step S408 using the above generated binary image data B. Lastly, the angle and/or direction corrected image document is generated in the step S405. In the above described process, the number of binarization steps is reduced. Furthermore, the angle/direction detection and the brightness reversal have been improved in their precision.

Now referring to FIG. 5, a flow chart illustrates steps involved in a fourth preferred process of the document processing prior to the character recognition process according to the current invention. According to the preferred process, gray image data is generated, and the brightness reversal determination is performed. Initially, gray scale image data A is generated from the input multi-value color image in a step S501. Subsequently, the entire brightness reversal determination step is performed in a step S502. It is determined whether or not the gray scale image data A has been entirely reversed in brightness in a step S503. If it is determined in the step S503 that the brightness has not been reversed, binary image data A is generated from the input multi-value color image in a step S504. The angle/direction detection is attempted in a step S505 using the above generated binary image data A. Subsequently, the angle and/or direction corrected image document is generated based upon the detected angle and direction in a step S506. On the other hand, when it is determined that the brightness has been indeed reversed in the step S503, black and white reversed image data or brightness reversed image data B is generated from the gray scale image data A in a step S507. The reversed image data B is again digitized to generate the digitized image data B in a step S508. The angle detection is attempted in a step S509 using the above generated binary image data B. Lastly, the angle and/or direction corrected image document is generated in the step S506. In the above described fourth preferred process, the number of binarization steps is reduced. Furthermore, the angle/direction detection and the brightness reversal have been improved in their precision. Furthermore, according the fourth preferred process, since the gray scale image is generated in the step S501, the cost in processing time and the memory requirement is reduced in generating the digitized image from the color image, reversing the color image and storing the reversed image data.

In generating the brightness reversed image from a multi-value image according the above described first through fourth preferred processes of the current invention, a fifth preferred process modifies a color map without rewriting the data. Although it is not possible for a color image without a color map such as a 24-bit full color image, a gray image in the DIB format as used in a personal computer (PC) or a 256-color image as called an index color have a color map which manages in corresponding data and colors. More concretely, the remake of a color map will be described. This means to generate another color map when the brightness of a color map is reversed. For example, when the original color map has the following sequence such as (R, G, B)=(0, 0, 0), (1, 1, 1), (2, 2, 2), ~(255, 255, 255), another color map is generated as follows: (R, G, B)=(255, 255, 255), (254, 254, 254), ~(0, 0, 0). As illustrated above, it is not necessary to change data in the data portion since only color map information is written. Because of this feature, it is possible to perform a high speed process regardless of the data size.

In reversing the brightness of the image according the above described third through fifth preferred processes of the current invention, a sixth preferred process outputs a determination result to a next step when the original image is reversed in brightness as a result of the brightness determination. The next step is a character recognition process by a character recognition unit. The character recognition unit determines whether the input is the original image data or the brightness reversed image data. For example, when the character recognition unit uses the brightness reversed image data for the character recognition process and has some type of failure, the character recognition process is repeated using the original image data.

The above first through fifth preferred embodiments use the binary image data B after the complete reversal. If the result is successful in the angle and direction detection in the first through fifth preferred embodiments, a seventh preferred embodiment outputs to a next step or the character recognition unit that the output image data is indeed the brightness reversed data of the original image data. In comparison to the sixth preferred embodiment, the output timing is different in that the result is outputted when the angle and direction detection is successful. Prior to the character recognition process, it is determined whether or not the input image data is reversed in brightness.

An eight preferred embodiment is the process after the angle or direction detection is failed when the data is reversed in brightness and is digitized according the above described first through seventh preferred embodiments of the current invention. In the case of failure, the eighth preferred embodiment outputs to a next step or the character recognition unit a result indicative of the unclear or failed brightness reversal. Accordingly, the character recognition unit processes the character recognition based upon the input result.

A ninth preferred embodiment outputs no reversed brightness data after the angle or direction detection is failed when the data is reversed in brightness and is digitized according the above described first through seventh preferred embodiments of the current invention. In other words, the ninth preferred embodiment forces not to use the brightness reversed image data. By prohibiting the use of the brightness reversed image data as is in the next step, the failure is prevented in the following steps. By continuing the use of the original image data, the ninth preferred embodiment outputs the process and results according to the operator's intent.

Now referring to FIG. 6, a flow chart illustrates steps involved in a tenth preferred process of the document processing prior to the character recognition process according to the current invention. For example, the tenth preferred process corresponds to the determination step S401 of FIG. 4. Initially, gray scale image data A is inputted. Subsequently, gray scale brightness reversed image data B is generated from the gray scale image data A in a step S601. In a step S602, binary gray scale image data A is generated from the gray scale image data A. Similarly, the gray scale brightness reversed image data B is also digitized to generate the binary gray scale brightness reversed image data B in a step S603. In a step S604, a number of black pixels is counted in the binary gray scale image data A. In a step S605, a number of black pixels is counted in the binary gray scale brightness reversed image data B. Although FIG. 1 does not show, a pixel counting unit performs the above steps S604 and S605. In a step S606, the above black pixel count in the binary gray scale image data A and the binary gray scale brightness reversed image data B is compared with each other. If it is determined in the step S606 that the number of black pixels in the binary gray scale image data A is smaller than that in the binary gray scale brightness reversed image data B, the tenth preferred process proceeds to a step S607, where no brightness reversal is confirmed. On the other hand, it is determined in the step S606 that the number of black pixels in the binary gray scale image data A is not smaller than that in the binary gray scale brightness reversed image data B, the tenth preferred process proceeds to a step S608, where complete brightness reversal is confirmed. As described above, the brightness reversal is easily determined simply based upon the black pixel counts.

Figure 6A:
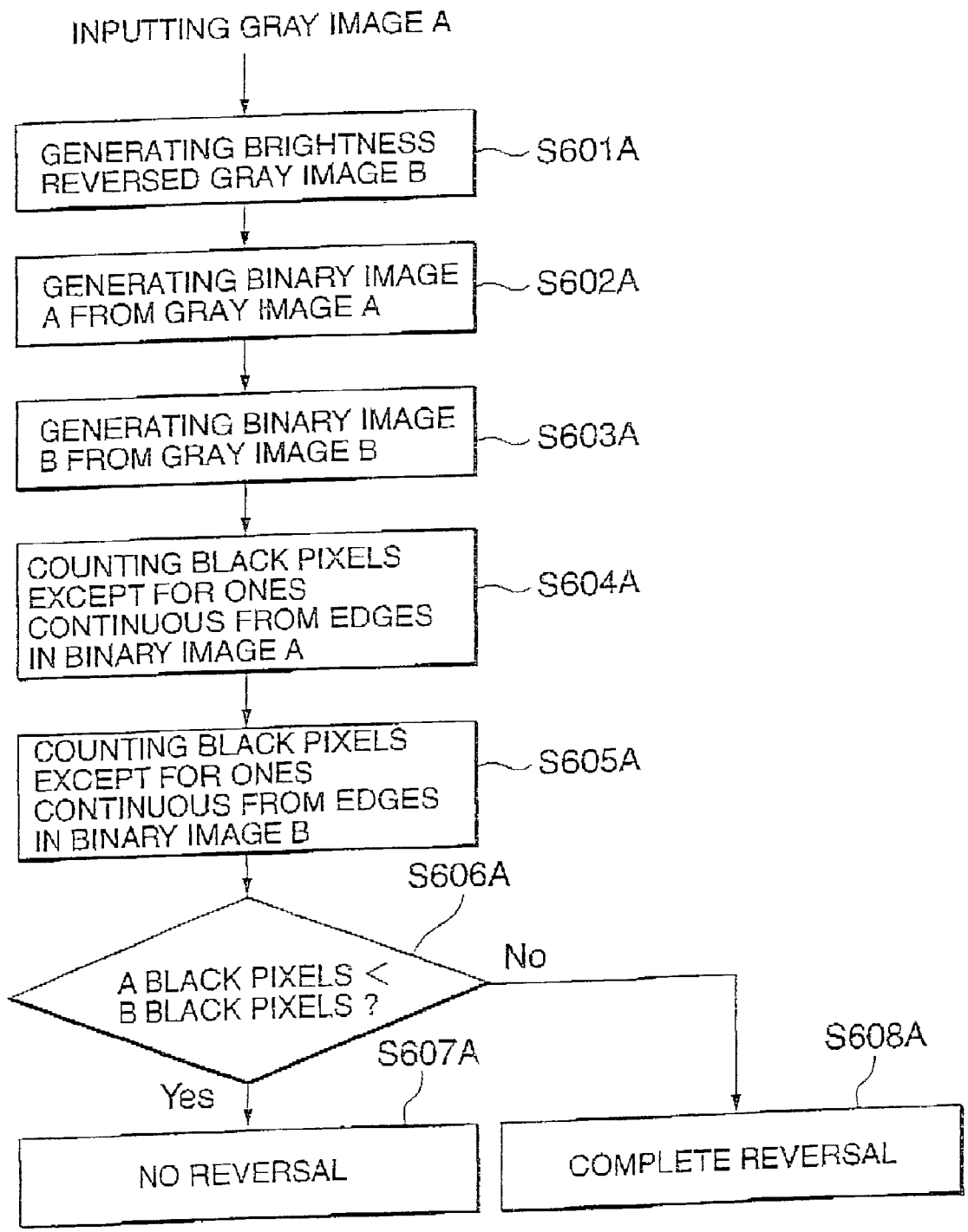
FIG. 6A is a flow chart illustrating steps involved in an eleventh preferred process of the document processing prior to the character recognition process according to the current invention.

Now referring to FIG. 6A, a flow chart illustrates steps involved in an eleventh preferred process of the document processing prior to the character recognition process according to the current invention. The eleventh preferred embodiment differs in a part of the brightness reversal determination from the above described tenth preferred embodiment. In general, the steps S601A, S602A and S603A of the tenth preferred process respectively correspond to steps S601, S602 and S603 of the tenth preferred process as shown in FIG. 6. Subsequently, unlike the steps S604A and S605A in counting the number of black pixels in the eleventh preferred process, the black pixels that are continuous from the up, down, right and left edges are excluded from the binary gray scale image data A and the binary gray scale brightness reversed image data B. The excluded continuous black pixels from the edges mean that they are continuous with the edges and form black pixels in a parallel, perpendicular or any other angles with respect to the edges. By excluding the above black pixels, the noise from the edges of a book is eliminated while the book is being scanned. As a result of the above noise elimination, the original document is correctly determined for reversing the brightness.

Still referring to FIG. 6A, the above black pixel count in the binary gray scale image data A and the binary gray scale brightness reversed image data B is compared with each other in a step S606A. If it is determined in the step S606A that the number of black pixels in the binary gray scale image data A is smaller than that in the binary gray scale brightness reversed image data B, the tenth preferred process proceeds to a step S607A, where no brightness reversal is confirmed. On the other hand, it is determined in the step S606A that the number of black pixels in the binary gray scale image data A is not smaller than that in the binary gray scale brightness reversed image data B, the tenth preferred process proceeds to a step S608A, where complete brightness reversal is confirmed. As described above, the brightness reversal is easily determined simply based upon the black pixel counts.

Figure 7:
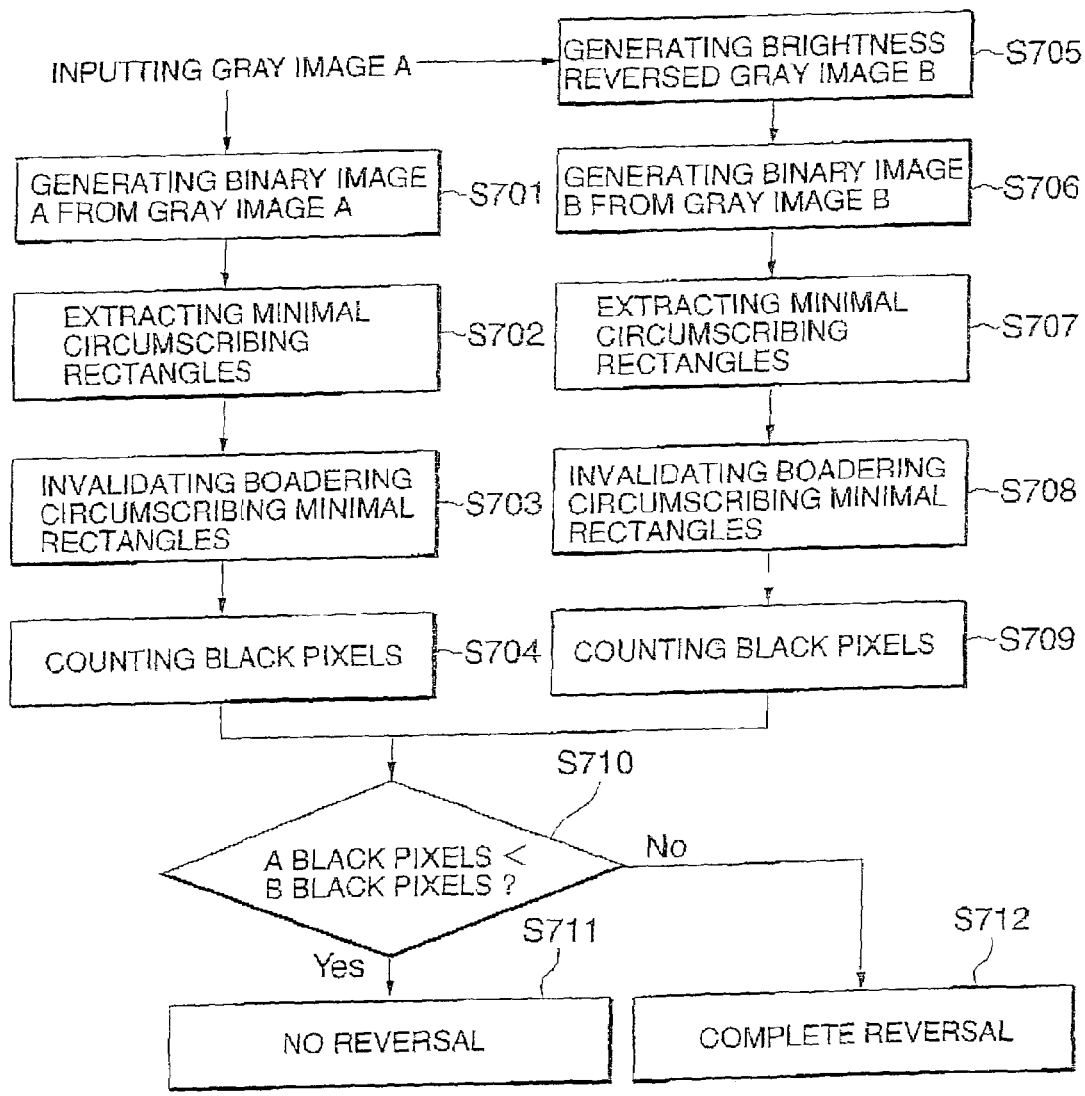
FIG. 7 is a flow chart illustrating steps involved in a twelfth preferred process of the document processing prior to the character recognition process according to the current invention.

Now referring to FIG. 7, a flow chart illustrates steps involved in a twelfth preferred process of the document processing prior to the character recognition process according to the current invention. In general, the twelfth preferred process optionally performs steps S701 through S704 on an original image and steps S705 through S709 on a reversed image in parallel. After inputting gray scale image data A that has been converted from color multi-value data, the step S701 generates binary gray scale image data A is generated from the gray scale image data A. In the step S702, a minimal circumscribing rectangle is extracted for each of continuous black pixel runs from the binary gray scale image data A. Among the extracted minimal circumscribing rectangles, if a minimal circumscribing rectangle contacts top, bottom, right or left coordinate of the original, the rectangle is excluded or marked invalid in the step S703. In the step S704, a number of black pixels is counted in the extracted minimal circumscribing rectangle after the exclusion in the above in the above step S703. Similarly, the steps S705 through S709 are performed on the brightness reversed image. In the step S705, brightness reversed gray scale image data B is generated from the gray scale image data A. In the step S706, binary brightness reversed gray scale image data B is generated from the brightness reversed gray scale image data B. In the step S707, a minimal circumscribing rectangle is extracted for each of continuous black pixel runs from the binary gray scale image data B. Among the extracted minimal circumscribing rectangles, if a minimal circumscribing rectangle contacts top, bottom, right or left coordinate of the original, the rectangle is excluded or marked invalid in the step S708. In the step S709, a number of black pixels is counted in the extracted minimal circumscribing rectangle after the exclusion in the above step S708.

Still referring to FIG. 7, the above black pixel count in the binary gray scale image data A and the binary gray scale brightness reversed image data B is compared with each other in a step S710. If it is determined in the step S710 that the number of black pixels in the binary gray scale image data A is smaller than that in the binary gray scale brightness reversed image data B, the twelfth preferred process proceeds to a step S711, where no brightness reversal is confirmed. On the other hand, it is determined in the step S710 that the number of black pixels in the binary gray scale image data A is not smaller than that in the binary gray scale brightness reversed image data B, the twelfth preferred process proceeds to a step S712, where complete brightness reversal is confirmed. Based upon the above, the noise from the edges of a book is eliminated while the book is being scanned. As a result of the above noise elimination, the brightness reversal is correctly determined only for the original document.

Figure 8:
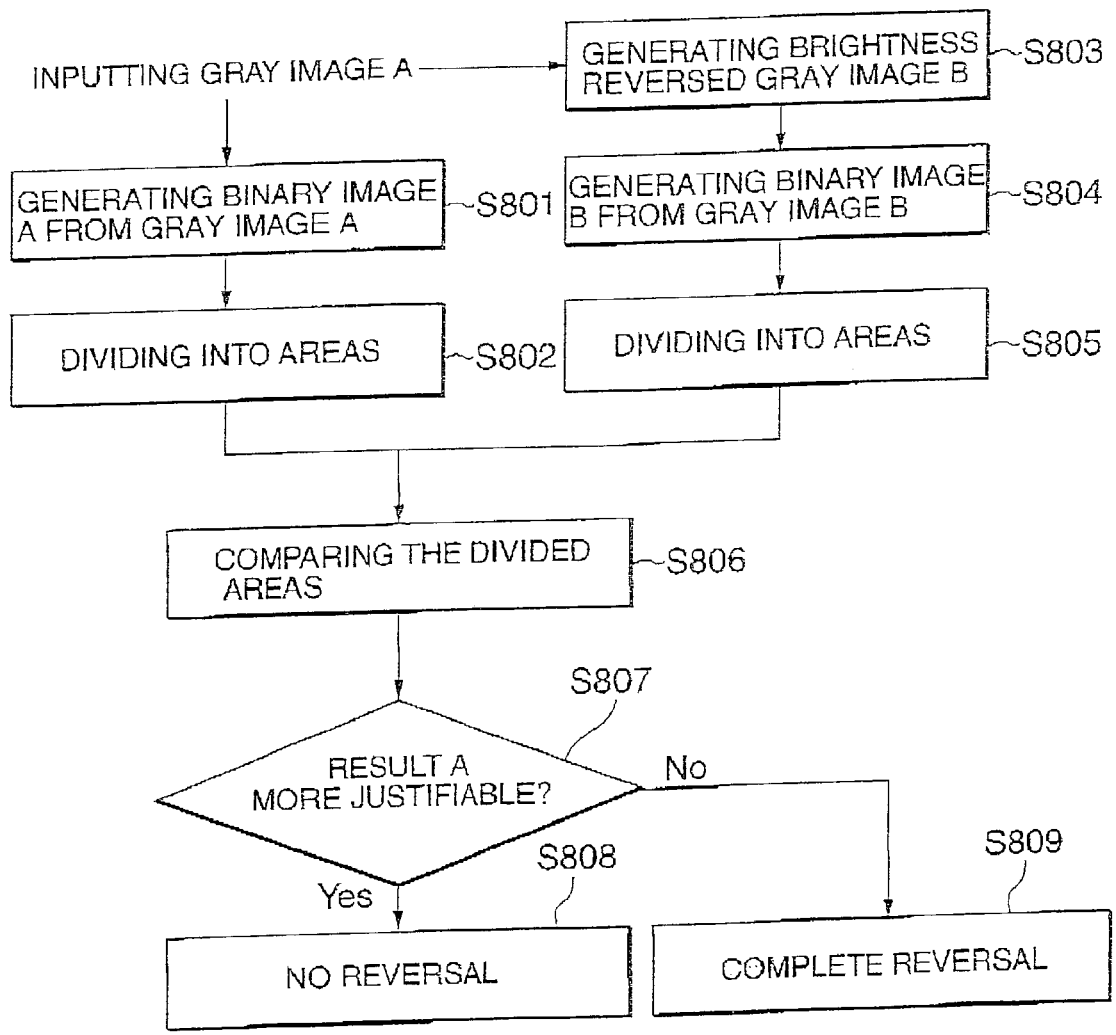
FIG. 8 is a flow chart illustrating steps involved in a thirteenth preferred process of the document processing prior to the character recognition process according to the current invention.

Now referring to FIG. 8, a flow chart illustrates steps involved in a thirteenth preferred process of the document processing prior to the character recognition process according to the current invention. In general, the eleventh preferred process optionally performs steps S801 and S802 on an original image and steps S803 through S805 on a reversed image in parallel. After inputting gray scale image data A that has been converted from color multi-value data, the step S801 generates binary gray scale image data A is generated from the gray scale image data A. In the step S802, the binary gray scale image data A is automatically divided into areas. Similarly, the steps S803 through S805 are performed on the brightness reversed image. In the step S803, brightness reversed gray scale image data B is generated from the gray scale image data A. In the step S804, binary brightness reversed gray scale image data B is generated from the brightness reversed gray scale image data B. In the step 805, the binary brightness reversed gray scale image data B is automatically divided into areas.

Still referring to FIG. 8, the above area division result in the steps S802 and S805 is compared with each other in a step S806. If it is determined in a step S807 that the result form the image data A is more likely to be justified that that of the image data B, the thirteenth preferred process proceeds to a step S808, where no brightness reversal is confirmed. On the other hand, it is determined in the step S807 that the result form the image data A is not more likely to be justified that that of the image data B, the thirteenth preferred process proceeds to a step S809, where complete brightness reversal is confirmed.

Now referring to FIG. 9, a block diagram illustrates components for implementing the above area division technique. The above area division is described with respect to the image data A and B. The evaluation of the area division is implemented by the technique that has been disclosed in Japanese Patent Publication Hei 11-110482 by the applicant. A first area dividing unit 901 and a second area dividing unit 902 divide the input document image into elements such as character areas and utilize a different area dividing method or technique. An area division result evaluation unit 903 evaluates the division results based upon the change in character size and the alignment of the lines and selects an area having a high division result. By evaluating the division results, the brightness reversal is determined. Other components include an image input unit 900, a data transmission unit 904, a data memory unit 905 and a control unit 906.

In a fourteenth preferred process, the binary brightness reversed gray scale image data B and the brightness reversed gray scale image data B are not immediately generated. In stead, the binary gray scale image data A and the gray scale image data A are generated. From the binary gray scale image data A, a minimal circumscribing rectangle is extracted, and the minimal circumscribing rectangle circumscribes continuous white pixel runs. Based upon the area of the extracted minimal circumscribing rectangle and the whole area of the binary gray scale image data A, the brightness conditions are empirically determined. The brightness reversal is basically determined not to exist when the area where black characters are assumed to be on the white background is relatively large with respect to the entire area.

Now referring to FIG. 10, a flow chart illustrates steps involved in the above described process of determining the brightness reversal based upon the areas in the fourteenth preferred process according to the current invention. After inputting gray scale image data A that has been converted from color multi-value data, a step S1001 generates binary gray scale image data A is generated from the gray scale image data A. In a step 1002, from the binary gray scale image data A, a minimal circumscribing rectangle is extracted, and the minimal circumscribing rectangle circumscribes continuous white pixel runs. In a step 1003, the extracted white pixel minimal circumscribing rectangles are sorted according to their area size. In a loop consisting of steps S1004 through 1006, a predetermined number of the largest extracted white pixel minimal circumscribing rectangles are extracted, and the extracted areas are added to the total white pixel area S2 in a step S1005. The above process is repeated for the predetermined number of times that is specified by N times ranging from 2 to 10. The loop is repeated by going back from the step S1006 to the step S1004. When it is determined that the loop concludes in the step S1006, a ratio of the total white pixel area S2 with respect to the total area S1 of the binary gray scale image data A is determined. The ratio is compared to a predetermined threshold Th 1 in a step 1007. For example, the predetermined threshold Th 1 ranges from 0.4 to 0.6. When it is determined that (S2/S1) is larger than Th 1 in the step S1007, the fourteenth preferred process proceeds to a step S1008, where no brightness reversal is confirmed. On the other hand, it is determined in the step S1007 that that (S2/S1) is not larger than Th 1, the fourteenth preferred process proceeds to a step S1009, where complete brightness reversal is confirmed. The larger the total white pixel area S2 becomes, the above ratio S2/S1 becomes. For this reason, the brightness reversal is simply determined based upon the comparison to an appropriate value of the predetermined threshold Th 1.

The above described predetermined threshold Th 1 will be further described here. Since the background area occupies a substantial portion of the area that contains an image, the value of the predetermined threshold Th 1 is generally set to close to a normal value, 0.5 in order to determine whether the black area or the white area is simply larger. However, according to the above described calculation, the black pixel area is not necessarily equal to the difference between the entire area and the white pixel area. Since the white pixel area is approximated by the white pixel minimal circumscribing rectangles, a diagonal white line is assumed to have a much larger area. Because of the above assumption for the white pixel areas, the predetermine threshold value is set to somewhere between 0.4 and 0.6 with some room and is empirically or statistically determined from the normal value of 0.5.

The above described predetermined repletion N will be further described here. The predetermined repletion N is set to 2 to 10 since it takes too much processing time if every white pixel minimal circumscribing rectangle is searched. In order to reduce the processing time, only potentially valid circumscribing rectangles are processed in the order of the area size by specifying a number that is larger than one. In practice, when similar area sizes exist in a plurality against white background, it is a special case. By limiting the predetermined repletion number N for processing, the processing time is reduced. As a result, since not all of the rectangles are added, it is desired that the predetermined threshold Th 1 be set to a value that is smaller than the standard value 0.5.

Figure 10A:
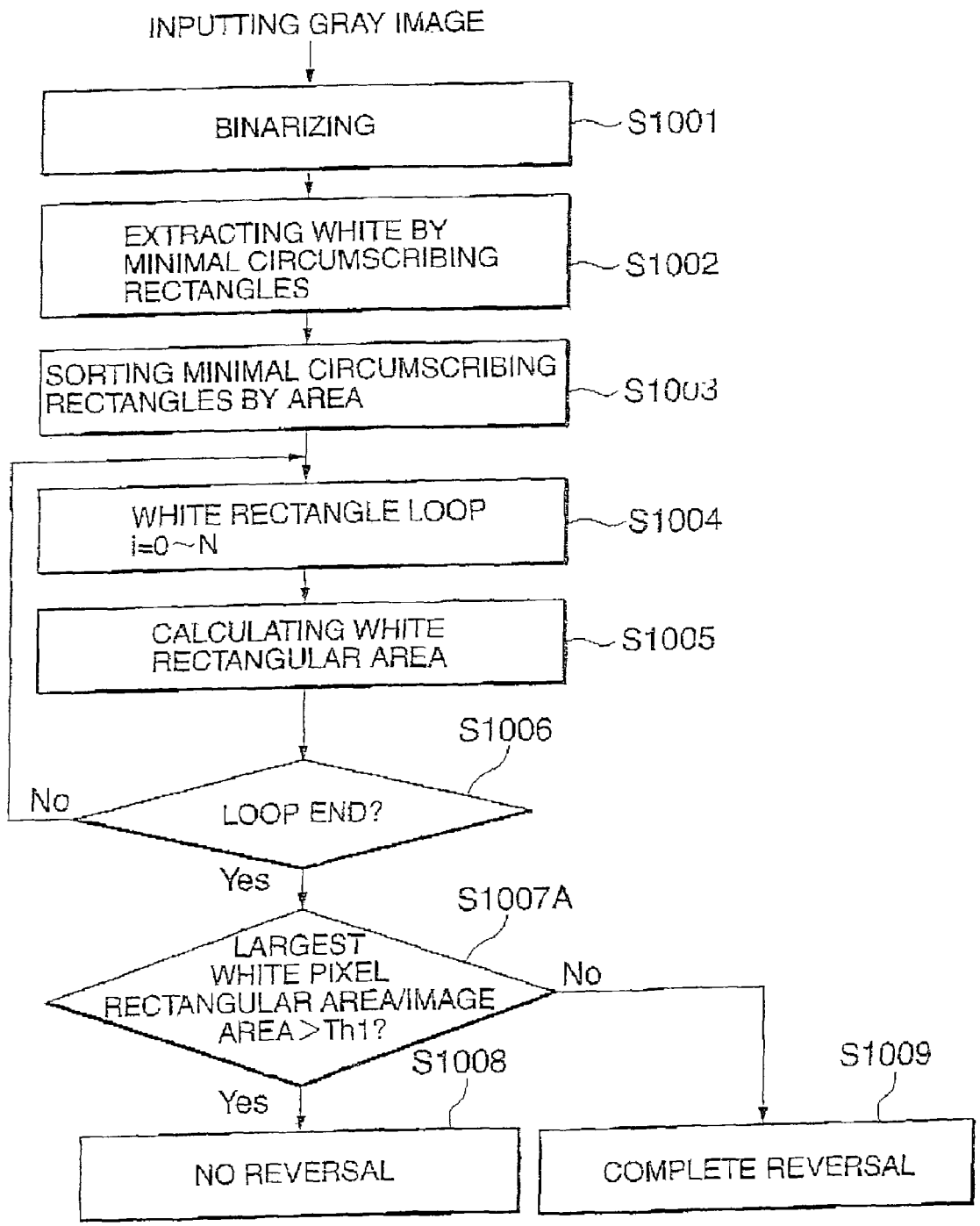
FIG. 10A is a flow chart illustrating steps involved in the above described process of determining the brightness reversal in a fifteenth preferred process according to the current invention.

Now referring to FIG. 10A, a flow chart illustrates steps involved in the above described process of determining the brightness reversal in a fifteenth preferred process according to the current invention. In general, the fifteenth preferred process differs from the fourteenth preferred process in that a ratio of the total white pixel area S2 with respect to a total white pixel minimal circumscribing rectangle area S3 is determined, and the ratio is compared to a predetermined threshold Th 1. The total white pixel minimal circumscribing rectangle area S3 is determined by two sets of coordinates of white pixel minimal circumscribing rectangles in the image area. With respect to the Y axis, the minimal coordinate (Xs, Ys) and the maximal coordinate (Xe, Ye) are selected to include every one of the white pixel minimal circumscribing rectangles, and the above two sets of the coordinates define the total white pixel minimal circumscribing rectangle area S3. As described above for the fourteenth preferred process, by using a predetermined threshold Th 1, the brightness reversal is correctly determined by establishing the ratio (S2/S3) is smaller than the predetermined threshold value Th1. The above accurate determination is made to exclude noise without determining the noise level that is caused by scanning an original.

Still referring to FIG. 10A, the detail description of the steps is provided for the fifteenth preferred process according to the current invention. After inputting gray scale image data A that has been converted from color multi-value data, a step S1001 generates binary gray scale image data A is generated from the gray scale image data A. In a step 1002, from the binary gray scale image data A, a minimal circumscribing rectangle is extracted, and the minimal circumscribing rectangle circumscribes continuous white pixel runs. In a step 1003, the extracted white pixel minimal circumscribing rectangles are sorted according to their area size. In a loop consisting of steps S1004 through 1006, a predetermined number of the largest extracted white pixel minimal circumscribing rectangles are extracted, and the extracted areas are added to the total white pixel area S2 in a step S1005. The above process is repeated for the predetermined number of times that is specified by N times ranging from 2 to 10. The loop is repeated by going back from the step S1006 to the step S1004. When it is determined that the loop concludes in the step S1006, a ratio of the total white pixel area S2 with respect to a total white pixel minimal circumscribing rectangle area S3 is determined in a step S1007A. The ratio is compared to a predetermined threshold Th 1 in the step 1007A. For example, the predetermined threshold Th 1 ranges from 0.4 to 0.6. When it is determined that (S2/S1) is larger than Th 1 in the step S1007A, the fifteenth preferred process proceeds to a step S1008, where no brightness reversal is confirmed. On the other hand, it is determined in the step S1007A that that (S2/S1) is not larger than Th 1, the fifteenth preferred process proceeds to a step S1009, where complete brightness reversal is confirmed. The larger the total white pixel area S2 becomes, the above ratio S2/S1 becomes. For this reason, the brightness reversal is simply determined based upon the comparison to an appropriate value of the predetermined threshold Th 1.

A sixteenth preferred process is an alternative process of the above described fourteenth and fifteenth preferred processes according to the current invention. In the fourteenth and fifteenth preferred processes, the area of the white minimal circumscribing rectangles is used for the brightness reversal. This is because when black characters are used on a white background, since the background color is obviously white, the white area is normally larger than the black character area. For example, in the fourteenth preferred process, the area S2 is calculated for the white background area, and the ratio with respect to the entire image area S1 is used to determine the brightness reversal. For this reason, a high possibility exists that a white pixel minimal circumscribing rectangle with a small white pixel area is erroneously processed. In the sixteenth preferred process, after a minimal circumscribing rectangle is extracted for the continuous white pixel runs, the extracted white pixel minimal circumscribing rectangle is removed when the white area ratio is lower than a predetermined ratio Th 2 ranging from 0.3 to 0.6 even if it is one of the predetermined largest rectangles in the above described step 1007 or 1007A. The above removal improves the accuracy in determining the brightness reversal. The above described predetermined ratio prevents a white pixel minimal circumscribing rectangle with a small area of actual white pixel from being added in the total white area. As mentioned before, when a diagonal white line exists, a corresponding white pixel minimal circumscribing rectangle has a large area, but the actual white pixel area is disproportionately small. For example, when characters are densely placed till near edges of the image, the number of actual white pixels is reduced. However, since the background is white, it is still most natural to treat the entire area as a white background area. Another example is a star-shaped white area with a large number of zigzags against dark background. In the above situation, the white pixel ratio is reduced since there are black pixels near the valley lines. To deal with the above problem, it is useful that the predetermined threshold Th 2 has a value in a range between 0.3 and 0.6 below the normal threshold value of 0.5 for the black pixel occupancy rate in the background.

Now referring to FIG. 11, a flow chart illustrates steps involved in a seventeenth preferred process of determining the brightness reversal according to the current invention. In general, a reduced binary image data is generated, and the brightness reversal is determined based upon the reduced binary image data. After inputting gray scale image data A that has been converted from color multi-value data, a step S1101 generates gray scale image data is reduced according to a predetermined reduction rate M1. For example, the predetermined reduction rate M1 is 12.5%, 25% or 50%. These reduction rate values respectively reduce the image by ⅛, ¼ or ½, and these rates are processed at a relatively high speed. Furthermore, the preferred process is optionally configured to select a resolution level R1 based upon the resolution of the input image data, and the resolution level R1 is used as the reduction rate M1. In this case, the reduction rate M1 is determined in order to obtain the image data at the R1 resolution level. The resolution level R1 value includes 50 dpi, 72 dpi, 100 dpi, 150 dpi and 200 dpi. In response to the input expected resolution level, since these values generally often correspond to a multiple of the 1/n, where n is an integer, the size variation process is smoothly performed. In a step 1102, the reduced gray scale image data is digitized. In a step 1103, a minimal circumscribing rectangle is extracted from the digitized image data A, and the minimal circumscribing rectangle circumscribes continuous white pixel runs. In a step 1104, a total white pixel minimal circumscribing rectangle area S3 is determined. From the total white pixel minimal circumscribing rectangle area S3, the extracted white pixel minimal circumscribing rectangles are sorted according to their area size in a step S1105. In a loop consisting of steps S1006 through 1009, a predetermined number of the largest extracted white pixel minimal circumscribing rectangles are extracted, and each of the extracted white pixel minimal circumscribing rectangles is compared to a predetermined white pixel ratio threshold value Th 2 in the step 1107.

The predetermined white pixel ratio threshold value Th 2 ranges from 0.3 to 0.6. If the white pixel ratio of the extracted white pixel minimal circumscribing rectangle is larger than the predetermined white pixel ratio threshold value Th 2, the area of the extracted white pixel minimal circumscribing rectangle is added to the total white pixel area S2 in a step S1108. On the other hand, if the white pixel ratio of the extracted white pixel minimal circumscribing rectangle is not larger than the predetermined white pixel ratio threshold value Th 2, the preferred process returns to the step S1106. The above process is repeated for the predetermined number of times that is specified by N times ranging from 2 to 10. When it is determined that the loop concludes in the step S1109, the ratio between the total white pixel area S2 and the total white pixel minimal circumscribing rectangle area S3 is determined and is compared in a step S1110 to a predetermined threshold value Th 3, whose exemplary value is ½. When it is determined that (S2/S1) is larger than Th 3 in the step S1110, the seventeenth preferred process proceeds to a step S1111, where no brightness reversal is confirmed. On the other hand, it is determined in the step S1110 that that (S2/S1) is not larger than Th 3, the seventeenth preferred process proceeds to a step S1112, where complete brightness reversal is confirmed.

Still referring to FIG. 11, using the reduced image data, the data capacity is small, and the brightness reversal determination is performed at a high speed. In addition, certain data compression methods such as JPEG cause data degradation and certain image processing for printing causes undesirable white noise area in or around black areas. The above noise also causes unnecessary minimal circumscribing rectangles during the minimal circumscribing rectangle extraction, and the brightness reversal determination is undesirably affected. According to the use of the above described reduced image data, the white noise is substantially prevented. Furthermore, the digitized reduced image data is used in other processes. Alternatively, the original image data is optionally used in character recognition.

The above described preferred processes of image processing are implemented on software executed on personal computers and work stations. The software program is stored in readable storage media such as a hard disk, a floppy disk, CD-ROM, MO and DVD, and the computer reads the software program from the above storage medium for execution. Furthermore, the software program is distributed by the above storage medium or networks such as the Internet.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of detecting the direction of a document image, comprising the steps of:
    inputting the document image in original multi-value data;
    determining whether the document image has been reversed in brightness, said determining step further comprises the following steps of:
    digitizing the multi-value data into digitized image data;
    extracting a first set of minimal circumscribing rectangles containing continuous black pixels from the digitized image data;
    counting a first number of black pixels in the first set of the extracted minimal circumscribing rectangles;
    reversing brightness of the original multi-value data into brightness reversed image data;
    digitizing the brightness reversed image data into digitized brightness reversed image data;
    extracting a second set of minimal circumscribing rectangles containing continuous black pixels from the digitized brightness reversed image data;
    counting a second number of black pixels in the second set of the extracted minimal circumscribing rectangles; and
    determining the brightness reversal based upon the first number and the second number; and
    in case that the document image has not been reversed in brightness, digitizing the multi-value data into digitized image data; and detecting the direction of the document image based upon the digitized image data; or
    in case that the document image has been reversed in brightness, reversing brightness of the original multi-value data into brightness reversed image data; digitizing the brightness reversed image data into digitized brightness reversed image data; and detecting the direction of the document image based upon the digitized brightness reversed image data.

2. The method of detecting the direction of a document image according to claim 1 further comprising an additional step of generating the multi-value data in gray-scale prior to said determining step.

3. The method of detecting the direction of a document image according to claim 1 further comprising an additional step of correcting the direction of the document image based upon the detected direction.

4. The method of detecting the direction of a document image according to claim 1 wherein said reversing step modifies a color map of the original multi-value data.

5. The method of detecting the direction of a document image according to claim 1 further comprising an additional steps of:
    excluding any one of the first set of the extracted minimal circumscribing rectangles that touches edges to have first remaining minimal circumscribing rectangles before counting the first number; and
    excluding any one of the second set of the extracted minimal circumscribing rectangles that touches edges to have second remaining minimal circumscribing rectangles before counting the second number.

6. The method of detecting the direction of a document image according to claim 5 further comprising an additional steps of:
    excluding any one of the black pixels that is continuous with the edges in the first remaining minimal circumscribing rectangles before counting the first number; and
    excluding any one of the black pixels that is continuous with the edges in the second remaining minimal circumscribing rectangles before counting the second number.

7. A system for detecting the direction of a document image, comprising:
    a document input unit for generating the document image in original multi-value data;
    a digitizing unit connected to said document input unit for digitizing the document image;
    a brightness reversing unit connected to said document input unit for reversing brightness of the document image;
    a direction detection unit connected to said document input unit for detecting direction of the document image; and
    a brightness reversal determination unit connected to said document input unit for determining whether the document image has been reversed in brightness, said brightness reversal determination unit determining the brightness reversal based upon a first number and a second number, said digitizing unit digitizing the multi-value data into digitized image data, said brightness reversal determination unit extracting a first set of minimal circumscribing rectangles containing continuous black pixels from the digitized image data, said brightness reversal determination unit counting the first number of black pixels in the first set of the extracted minimal circumscribing rectangles, said brightness reversing unit reversing brightness of the original multi-value data into brightness reversed image data, said digitizing unit digitizing the brightness reversed image data into digitized brightness reversed image data, said brightness reversal determination unit extracting a second set of minimal circumscribing rectangles containing continuous black pixels from the digitized brightness reversed image data, and said brightness reversal determination unit counting the second number of black pixels in the second set of the extracted minimal circumscribing rectangles, in case that the document image has not been reversed in brightness, said digitizing unit digitizing the multi-value data into digitized image data, said direction detection unit detecting the direction of the document image based upon the digitized image data, or in case that the document image has been reversed in brightness, said brightness reversing unit reversing brightness of the original multi-value data into brightness reversed image data, said digitizing unit digitizing the brightness reversed image data into digitized brightness reversed image data, and said direction detection unit detecting the direction of the document image based upon the digitized brightness reversed image data.

8. The system for detecting the direction of a document image according to claim 7 further comprising a document direction correction unit connected to said direction detection unit for correcting the direction of the document image based upon the detected direction.

9. The system for detecting the direction of a document image according to claim 7 wherein said brightness reversing unit reversing the brightness by modifying a color map of the original multi-value data.

10. The system for detecting the direction of a document image according to claim 9 wherein said brightness reversal determination unit excludes any one of the first set of the extracted minimal circumscribing rectangles that touches edges to have first remaining minimal circumscribing rectangles before counting the first number, said brightness reversal determination unit also excluding any one of the second set of the extracted minimal circumscribing rectangles that touches edges to have second remaining minimal circumscribing rectangles before counting the second number.

11. The system for detecting the direction of a document image according to claim 10 wherein said brightness reversal determination unit further excludes any one of the black pixels that is continuous with the edges in the first remaining minimal circumscribing rectangles before counting the first number, said brightness reversal determination unit further excluding any one of the black pixels that is continuous with the edges in the second remaining minimal circumscribing rectangles before counting the second number.

12. A system for detecting the direction of a document image, comprising;
a document input unit for generating the document image in original multi-value data;
a digitizing unit connected to said document input unit for digitizing the document image;
a brightness reversing unit connected to said document input unit for reversing brightness of the document image;
a direction detection unit connected to said document input unit for detecting direction of the document image; and
a brightness reversal determination unit connected to said document input unit for determining whether the document image has been reversed in brightness, wherein said brightness reversal determination unit determines the brightness reversal based upon a first division evaluation result and a second division evaluation result, said digitizing unit digitizing the multi-value data into digitized image data, said brightness reversing unit reversing brightness of the original multi-value data into brightness reversed image data, said digitizing unit digitizing the brightness reversed image data into digitized brightness reversed image data;
a first area division unit connected to said digitizing unit for dividing the digitized image data into first divided areas according to a first predetermined rule;
a second area division unit connected to said digitizing unit for dividing the digitized brightness reversed image data into second divided areas according to a second predetermined rule; and
an area evaluation unit connected to said first and second area division units for evaluating the first divided areas to obtain the first division evaluation result and evaluating the second divided areas to obtain the second division evaluation result;
in case that the document image has been reversed in brightness, said brightness reversing unit reversing brightness of the original multi-value data into brightness reversed image data, said digitizing unit digitizing the brightness reversed image data into digitized brightness reversed image data, and said direction detection unit detecting the direction of the document image based upon the digitized brightness reversed image data.

13. A system for detecting the direction of a document images, comprising;
a document input unit for generating the document image in original multi-value data;
a digitizing unit connected to said document input unit for digitizing the document image;
a brightness reversing unit connected to said document input unit for reversing brightness of the document image;
a direction detection unit connected to said document input unit for detecting direction of the document image; and
a brightness reversal determination unit connected to said document input unit for determining whether the document image has been reversed in brightness, said brightness reversal determination unit determining the brightness reversal based upon a ratio with respect to a first predetermined threshold value, said digitizing unit digitizing the multi-value data into digitized image data, said brightness reversal determination unit extracting minimal circumscribing rectangles containing only white pixels from the digitized image data, said brightness reversal determination unit sorting the extracted minimal circumscribing rectangles according to area, said brightness reversal determination unit adding the area of a predetermined number of the largest ones of the extracted minimal circumscribing rectangles to generate a total white pixel minimal circumscribing rectangle area, and said brightness reversal determination unit obtaining the ratio of the total white pixel minimal circumscribing rectangle area to a total area of the digitized image data;
in case that the document image has been reversed in brightness, said brightness reversing unit reversing brightness of the original multi-value data into brightness reversed image data, said digitizing unit digitizing the brightness reversed image data into digitized brightness reversed image data, and said direction detection unit detecting the direction of the document image based upon the digitized brightness reversed image data.

14. A system for detecting the direction of a document image, comprising:

a document input unit for generating the document image in original multi-value data;

a digitizing unit connected to said document input unit for digitizing the document image;

a brightness reversing unit connected to said document input unit for reversing brightness of the document image;

a direction detection unit connected to said document input unit for detecting direction of the document image; and a brightness reversal determination unit connected to said document input unit for determining whether the document image has been reversed in brightness, said brightness reversal determination unit determining the brightness reversal based upon a ratio with respect to a first predetermined threshold value, said digitizing unit digitizing the multi-value data into digitized image data, said brightness reversal determination unit extracting minimal circumscribing rectangles containing only white pixels from the digitized image data, said brightness reversal determination unit sorting the extracted minimal circumscribing rectangles according to area, said brightness reversal determination unit adding the area of a predetermined number of the largest ones of the extracted minimal circumscribing rectangles to generate a total white pixel minimal circumscribing rectangle area, said brightness reversal determination unit determining a largest minimal circumscribing rectangular area containing all of the extracted minimal circumscribing rectangles, and said brightness reversal determination unit obtaining the ratio of the total white pixel minimal circumscribing rectangle area to the largest minimal circumscribing rectangular area;

in case that the document image has been reversed in brightness, said brightness reversing unit reversing brightness of the original multi-value data into brightness reversed image data, said digitizing unit digitizing the brightness reversed image data into digitized brightness reversed image data, and said direction detection unit detecting the direction of the document image based upon the digitized brightness reversed image data.

* * * * *